United States Patent Office 2,753,305
Patented July 3, 1956

2,753,305

LUBRICATING COMPOSITION

Roland A. Whitbeck, Lorain, Ohio, assignor to Pennsylvania Salt Manufacturing Co., Philadelphia, Pa., a corporation of Pennsylvania No Drawing. Application September 26, 1955,
Serial No. 536,787

11 Claims. (Cl. 252—18)

This invention relates to an improved lubricating composition of which at least most of the ingredients can be dissolved, or dispersed and suspended, readily in a solution-dispersion system capable of being applied in the form of a fine spray on the surface of sheet, rod, and tubular metal stock to be drawn in dies, and of being dried on the stock almost instantaneously upon its application thereon so as to form on the stock a dry, substantially homogeneous, self-adherent, tenacious, lubricating and protecting film or coating of which the residue remaining after the formation of the stock in dies can be removed readily by a warm alkaline bath.

The present invention is an improvement in the compositions disclosed in the following United States Letters Patent and applications: No. 2,530,837 of Orozco and Henricks, dated November 21, 1950, Reissue No. 23,184 of R. A. Whitbeck, dated December 20, 1949, No. 2,530,838 of Orozco and Roy, dated November 21, 1950, Nos. 2,578,585 and 2,578,586, both of Orozco and Roy, dated December 11, 1951, and application Serial No. 251,455 of G. H. Orozco, filed October 15, 1951, now abandoned.

The foregoing patents teach in general that a dry composition capable of being dissolved or readily dispersed in water and applied as an aqueous solution-dispersion system on the surface of the stock and dried thereon to form a water soluble and dispersible dry homogeneous self-adherent lubricating and portecting film may consist essentially of the following, by dry weight:

| | Range in parts | Preferred in parts |
|---|---|---|
| Part "A": Water soluble or readily water dispersible, fatty or waxy polar organic lubricating binder, preferably of high molecular weight, and solid at room temperature, such, for example, as the following: soap, preferably high titre soap having a melting point of at least about 36° C.; polymerized or esterified aliphatic polyhydric alcohols having less than 4 hydroxy groups and the fatty acid esters thereof, each of which is of the type that is solid at room temperature and each of which preferably has a melting point of at least about 40° C.; and synthetic waxes of high melting point and preferably a melting point of at least about 90° C.; and mixtures of any two or more of the foregoing | 10 to 33 | 20 |
| Part "B": Water soluble inorganic water liberating and glass forming material, preferably alkali earth metals with at least a major portion an alkali metal borate | 90 to 67 | 80 |
| Part "C" (Optional): Coupling and plasticizing material | ½ to 5 | 1 |

In the above formula, in those instances in which the polymerized and esterified polyhydric alcohols are used as the organic constituent, though they may be used in amounts as low as 5 parts per 100 parts, generally about 10 to 20 parts per hundred are preferred.

In use, such compositions are dissolved and dispersed in water in the amount of from 6 oz. to 32 oz. per gallon of water or solvent, and preferably in the amount of about 16 oz. per gallon.

It has been found that such compositions have certain disadvantages, the principal ones being the relatively long time required for drying the solution-dispersion after its application, the difficulty of spraying the solution-dispersion onto the stock effectively, some hygroscopicity in the resultant dry coating, and the unevenness of the resultant dry coating.

For example, due to its slow drying properties, the applied solution-dispersion tends to creep over the surface of the stock during drying, particularly if the bath is near the lower limit of temperature at the time of application of the solution, thus producing a resultant dry lubricating film which is wrinkled or is of varying thickness on different surface areas of the stock. In the case of edge drying, particularly after applying the solution-dispersion by dipping, there is a tendency for the resultant coating to be thicker near the lower portion of the stock or, on the contrary, for substantial amounts of the semi-solid coating material to slide off of the stock in the form of a thin translucent film, a phenomenon known as "cellophaning" inasmuch as the film, upon sliding off, has the appearance of a thin sheet of cellophane.

In spraying, the solution-dispersion tends to form into droplets of considerable size instead of a fine mist and the droplets accumulate on the stock as wet masses which do not dry rapidly and which tend to slide off. Also it clogs the spray nozzle very rapidly so that the stream of spray varies continuously during application.

After the coating is dried it tends to pick up considerable moisture from the air and thus is affected adversely by increases in humidity due to weather or localized shop conditions.

In those of the foregoing compositions which employ soap, the best results are obtainable with a soap of relatively high melting point, for example, soaps having a melting point of at least about 36° C. and preferably 42° C. or higher. As the melting point is increased, the hygroscopicity of the coating becomes less and the lubricity continues more effectively up to temperatures at which the inorganic constituents become effective for lubrication.

However, compositions consisting of such high melting point soaps and borax do not always draw out of the bath or tank in the proportions in which they are originally introduced, especially when the stock is coated by dipping or by spraying followed by draining back into the bath.

While as indicated above and in the patents hereinbefore enumerated, the preferred water-soluble soaps to be employed in the formulation of compositions in accordance with the present invention are high titre soaps, and particularly high titre soaps in which the mixed saponifiable fatty acid content thereof possesses a melting point of at least about 36° C., it is to be understood that any water-soluble soaps that will provide the desired lubricity and will permit the formation of the necessary dry homogeneous coating of the completed composition without material moisture pick-up can be employed. Therefore, water soluble soaps in which the melting point of the mixed fatty acid content thereof is above that of normal room temperature of about 25° C. can in may metal working operations be employed satisfactorily, since such soaps impart the required properties to the completed composition.

When this problem of changing proportions is serious, it is overcome, as taught in the above identified Orozco application, by the addition to these compositions of a coupler and a plasticizer which may be material part of which is coupler and part of which is plasticizer, but which preferably is a material which is a combined coupler and plasticizer, sulfonated castor oil being especially effective. The coupling and plasticizing material is added to the compositions in the amount of about ½ to 5 parts per 100 parts of dry composition and preferably in the ratio of about 1 part per 100. In general, it is added in displacement of part of the inorganic constituent, or of part of the organic lubricating material so long as the total remaining organic material does not fall below the minimum range hereinbefore disclosed, or of part of each.

The coupler and plasticizer makes possible the uniform draw out of the solution and it also appears to improve the lubricity of the resultant coating, making possible a thinner film. However, the resultant solution-dispersion still does not spray effectively or dry quickly, and the resultant film or coating is often thicker and more irregular than desired, and remains somewhat hygroscopic.

If the temperature of the bath is increased to a few degrees below the boiling point of the solution, foaming of the bath becomes very pronounced and adversely affects the resulting coating. This, I have found, can be overcome by the addition of a small amount of a soap solvent coupling agent or defoaming agent of the type hereinafter described; for example, from about two grams up to seven grams of defoaming agent per hundred pounds of the dry solute used in the bath is sufficient to reduce foaming of the bath without otherwise changing the resulting coating.

However, I have found further that when the solute is made into a bath in the amount of about six ounces of solute per gallon of water, the addition of the soap solvent coupling or defoaming agent in excess of seven grams or about .23 ounce per hundred pounds of the solute not only reduces the foaming but initiates a change in the behavior of the solution during application, and of the coating during drying, and further causes a change in the quality of the coating and in its behavior in the dies. The addition of the agent in the amount of about fourteen grams or about .45 ounce per one hundred pounds of solute to a bath in which the solute is present in the amount of ten ounces or more of solute per gallon of water, causes a very distinct change.

The changes and advantages resulting from increasing the amount of the soap solvent and coupling agent are obtained throughout a range from seven grams or about .25 ounce per one hundred pounds of dry solute to eighty grams or about 2.5 ounces per one hundred pounds of dry solute, the effect becoming very noticeable at about fourteen grams or about .45 ounce per one hundred pounds of solute, and very pronounced at from thirty-four or about 1.1 ounces to forty grams or about 1.3 ounces per one hundred pounds of solute. From the foregoing it is seen that the amount of soap solvent and coupling agent in terms of ounces per 100 pounds weight will be from about .25 ounce to about 2.5 ounces per 100 pounds of the solute with the preferred range being about .45 ounce to about 1.3 ounces per 100 pounds of the solute.

Except in very weak solutions of the lubricating material, such as one containing solute in the amount of about six ounces to each gallon of water, seven grams of the agent per hundred pounds of solute merely causes a defoaming action. When the amount of the agent reached ten grams per one hundred pounds of dry solute, the consistency of the bath changes regardless of the concentration, within the recited range, of solute in the bath. If ten grams of the agent per hundred pounds of solute is exceeded, and particularly when fourteen grams per one hundred pounds is reached, a distinctly different and better coating is obtained, the improvement continuing, being pronouncedly up to about thirty-four to forty grams per one hundred pounds of the dry solute.

From about forty grams of the agent per one hundred pounds of dry solute, up to eighty grams per one hundred pounds, the results improve but remain more nearly uniform although the solution is noticeably more watery and the resultant coating much thinner. The solution dries more rapidly as the upper limit of the amount of agent is approached.

The addition of the agent in amounts greater than eighty grams of defoamer per hundred pounds of solute does not cause such a noticeable change in the solution but thins down the solution thereby making possible a higher concentration of solute in the bath.

Thus, the invention can be practised by using the soap solvent and coupling agent in an amount ranging from slightly in excess of that required for defoaming up to saturation. The optimum for the particular job to be drawn can readily be determined by having in mind also that such agents are relatively expensive.

The dry mixture of the solute, whether or not including the plasticizer and coupler but including the agent in the amounts exceeding that required for defoaming is preferably used in amounts of from about eight ounces to thirty-two ounces per gallon of water.

It is advantageous, however, to include the coupler and plasticizer in the solute along with the soap solvent and coupling agent, and in such instances a concentration of about sixteen ounces of solute per gallon of water is preferred.

The bath is prepared by bringing it to a boil and then allowing it to drop somewhat below the boiling point, preferably to a temperature of from 195° F. to 210° F. At less than 195° F. the solution does not flow over the stock as uniformly and does not form as uniform as film as it does at about 195° F. to 210° F.

While the high titre soaps having a titre of from about 36 up are desirable and soaps having a titre of from forty to forty-three are preferred, nevertheless soaps with a titre so low as to melt at just above room temperature, for example at 23° C. up, may be used in some instances, for example, for coating stock for somewhat lighter draws.

As a defoamer, any one or more, or mixtures, of the sparingly water soluble, aliphatic alcohols is preferred. These alcohols appear to act as combined couplers and defoamers and are soap solvent coupling agents.

The better ones of these alcohols are those in the higher carbon range such, for example, as trimethyl nonyl alcohol, amyl alcohol, hexyl alcohol, nonyl alcohol, and 2-ethyl hexanol.

The 2-ethyl hexanol, though operating satisfactorily, boils at about 150° C. with a strong menthol odor and thus is not as satisfactory as some of the other alcohols recited.

The trimethyl nonyl alcohol is the preferred one as it has a very high boiling point, does not have an offensive odor, and is not irritating in heated aqueous baths. Any one of these alcohols or mixtures thereof may be used within the ranges recited.

In general, while the above aliphatic alcohols are preferred, I have found that various other soap solvent coupling agents are operative in their stead, both in the solutions above described and those hereinafter described, it being understood that in any of the foregoing and following examples, the coupling and plasticizing of the sulfonated oil type disclosed in the foregoing patents may be omitted, as also may be the paraffines, the remaining ingredients being present within the ranges recited hereinafter. These other soap solvent coupling agents are listed below and are characterized by having low vapor pressures so that they will not easily distill from the bath, by low water solubility combined with a high fat solubility, and preferably by boiling points appreciably above the boiling point of water. All of these soap solvent coupling agents are organic dipoles having a fat soluble tail and a hydrophillic head. The preferred high boiling materials of this group are distinguished from the sulfonated oil types of coupling and plasticizing material by their ability to solvate the soap micelles in place of the usual imbibed water so that a smooth, thin, homogeneous film of nearly anhydrous soap is deposited from the solution in place of the usually thick, gelatinous hydrated colloidal layer obtained from aqueous soap solutions not containing these novel high boiling soap solvent couplers.

TABLE I

SOAP SOLVENT COUPLING AGENTS

| Solvent | Boiling Point, °C. | Vapor Pressure at 20° C. | $H_2O$ Solubility in 100 cc. $H^2O$ |
|---|---|---|---|
| *Alcohols* | | | |
| 1. Trimethyl nonyl alcohol | 225 | 0.01 | 0.02. |
| 2. Butyl alcohol | 118 | 5.5 | 7.7. |
| 3. Amyl alcohol (normal) | 137 | 2.0 | 2.7. |
| 4. 2-butyl octanol | 252 | 0.11 | 0.01. |
| 5. Di-isobutyl carbinol | 178 | 0.30 | 0.06. |
| 6. 2-ethyl hexanol | 184 | 0.2 | 0.10. |
| 7. 2-ethyl butanol | 149 | 0.9 | 0.43. |
| 8. Heptanol | 156 | 0.5 | 0.45. |
| 9. Lauryl alcohols ("Lorol") | 256 | 0.01 | 0.01. |
| 10. Heptadecanol | 309 | 0.01 | 0.02. |
| 11. Methyl amyl alcohol | 132 | 2.8 | 1.7. |
| 12. Methyl isobutyl carbinol | 127 | 3.0 | 1.1. |
| 13. Tetradecanol | 264 | 0.01 | 0.02. |
| 14. Cyclohexanol (Hexalin) | 160 | 0.7 | 3.6. |
| 15. Pentanol-3 | 116 | 2.0 | 4.1. |
| 16. Tri methyl cyclohexanol | 188 | 0.5 | 0.1. |
| 17. Undecanol | 225 | 0.04 | 0.02. |
| *Ketones* | | | |
| 18. Di-isobutyl ketone | 168 | 1.7 | 0.06. |
| 19. Ethyl Butyl ketone | 148 | 3.9 | 1.4. |
| 20. Methyl isobutyl ketone | 116 | 1.7 | 2.0. |
| 21. Acetophenone | 201 | 0.30 | 0.6. |
| 22. "Ketosolv" Ketones mixture | below 200 | 1.0 | 1.0. |
| *Glycols* | | | |
| 23. Ethyl hexane diol | 244 | 0.01 | 4.2. |
| 24. Zethoxy di-methyl pentane diol | 214 | 0.01 | 2.5. |
| 25. Hexylene Glycol | 197 | 0.05 | complete. |
| 26. Octylene glycol | 270 | 0.01 | slight. |
| *Alcohol ethers* | | | |
| 27. Di butyl Carbitol | 255 | 0.02 | 0.30. |
| 28. Di butyl Cellosolve | 203 | 0.20 | 0.20. |
| 29. Di butoxy tetra glycol | 237 | 0.01 | 1.3. |
| 30. Phenyl Carbitol | 207 | 0.03 | 2.7. |
| 31. Phenyl Cellosolve | 245 | 0.03 | 2.7. |
| 32. Phenyl methyl alcohol carbinol | 204 | 0.1 | 2.3. |
| 33. Propylene glycol-butyl ether | 173 | 1.1 | 6.0. |
| 34. Di-propylene glycol butyl ether | 232 | below 0.5 | 4.3 |
| 35. Tri-propylene glycol butyl ether | 279 | below 0.5 | 1.5. |
| 36. Ethylene glycol phenyl ether | 245 | below 0.4 | 2.0. |
| 37. Propylene glycol phenyl ether | 465 | below 0.4 | insoluble. |
| 38. Di-propylene glycol phenyl ether | 315 | below 0.4 | Do. |
| 39. Propylene glycol butyl phenyl ether | 318 | below 0.4 | Do. |
| 40. Propylene glycol cyclohexyl phenyl ether | | below 0.4 | 0.1. |
| 41. Tripropylene glycol isopropyl ether | 262 | below 0.4 | 20.4. |
| *Ethers* | | | |
| 42. Dichloro ethyl ether | 178 | 0.1 | 1.1. |
| 43. Di ethyl hexyl ether | 269.4 | 0.01 | 0.01. |
| 44. Di hexyl ether | 226.2 | 0.07 | 0.01. |

The use of such defoamers and soap solvent coupling agents with the solutes disclosed in the above patents and pending application, with solutes employing lower titre soaps, with such solutes employing higher and lower ratios of organic to inorganic lubricating ingredients, results in very distinct advantages although these advantages are very much more pronounced in the case of solutes comprising high titre soaps and inorganic water liberating, glass forming, alkali metal salts.

It is a purpose of the present invention to further advance the art (a) by fortifying the organic constituents of such compositions for some uses by an additive having a considerable range of sufficiently high melting points and having sufficiently high lubricity throughout the ranges so that the initially operable constituents, including the additive, are highly effective for lubrication and remain so from the initiation of the draw up to a point at which the water liberating and glass forming salts become effective, and (b) by controlling and varying, by an additive the "average" melting point of the initially operative constituents, the temperature at which the composition becomes initially lubricating, lubricity of the composition, and (c) by providing a composition of which an aqueous solution-dispersion is relatively stable and can be sprayed readily and dried, almost instantly, to produce a resultant dry coating which is of extremely low hygroscopicity, much lower than those hereinbefore described, and of which the residue remaining on the stock after drawing washes off readily in a warm mild aqueous alkaline bath.

In accordance with the present invention, I have discovered that the use of the soap solvent coupling agents in excess of that required for defoaming makes it possible to improve and control the lubricity, hygroscopicity, sprayability, driability, and washability of solution-dispersion systems of dry compositions disclosed in the patents, applications, and the example hereinbefore discussed, by making possible, in turn, the inclusion in such compositions of an additive which, while not water soluble, is readily dispersible in an aqueous bath of the composition when containing the excess soap solvent coupling or defoaming agent, and which, when so dispersed therein, increases lubricity of the resultant coating, renders the solution readily sprayable, reduces the drying time so greatly that the solution dries almost instantly upon application, and fortifies and controls the composition by changing the melting point of that part of the composition which does not contain the water liberating and glass forming material, greatly reduces the hygroscopicity of the resultant coating, and produces a more uniform film or coating so that a thinner coating can be used safely.

The additive is paraffine, and preferably is used in amounts of from 1 to 8 parts per 100 parts of the dry composition, by weight.

Paraffines having melting points ranging, respectively, from 32° C. to 80° C. Each of these paraffines has very high lubricity throughout the range of temperatures encountered in die forming of sheet metal and drawing of tubes up to the temperature at which the initially operative one of the inorganics of the composition becomes effective and this lubricity appears to remain relatively uniform throughout this range.

Since paraffine of high lubricity throughout a wide range of melting points can be obtained readily and, in the composition in the presence of the excess defoaming agent, can be added to, and uniformly dispersed throughout an aqueous solution-dispersion system of the compositions, the paraffine can be used to raise or lower the average melting point of that part of the composition other than the inorganics. Thus, it can be used as a general conditioner and modifier for controlling the initially operable part of the composition—that is, the part other than the water liberating and glass forming materials, which operates from the initiation of the draw at least up to the point at which the water liberating and glass forming materials become operative for lubrication.

Accordingly, therefore, the described addition of excess soap solvent coupling agents and of paraffine makes possible the use of soaps and other organic lubricants with melting points as low as 26° C. where heretofore such soaps and lubricants and other organic lubricants were too hygroscopic and of too low a melting point for effective use for many drawing operations.

I have found that with the excess soap solvent coupling agents present in the solution-dispersion system, the paraffine does not rise and float to the surface or separate out but remains uniformly and finely dispersed throughout the solution-dispersion for very long periods of time. It draws out evenly with the other solute constituents so that as the bath is used up the ratio of lubricating ingredients remains substantially constant from start to finish.

The resultant solution-dispersion dries much more rapidly than if the paraffine were not used and may be applied to stock by dipping, but preferably by spraying, at a temperature a little below the boiling point, for example, about 190° F. to 205° F. on metal stock at a temperature of about 160° F. When so applied it dries instantaneously. There is not any observable flow of the resultant film during its formation.

Since the paraffine increases the lubricity and retains its lubricity up to a range beyond that at which the lubricating effectiveness of the organic binder begins to decrease, the composition provides somewhat of a stepwise lubrication in the initial stages of drawing and prior to the operation of the water liberating and glass forming materials.

Since the coating dries so rapidly and can be applied so uniformly, it makes possible the use of a thinner coating, thus reducing any tendency for "build-up" on the dies.

Paraffine is not water soluble and when used as a lubricant in the drawing of metals, the removal of its residue from metal after formation ordinarily presents the greatest of difficulties and requires hazardous chemical solvents. However, I have found that in combination with the lubricating materials described herein, in the presence of an excess of the soap solvent coupling agents, any residue of it, along with the other residues of the compositions, can be removed readily from a formed piece of metal stock by a warm mild alkaline bath.

When used in the compositions of the above patents and applications, the excess soap solvent coupling agents may be used either with or without the coupler and plasticizer, although the inclusion of coupler and plasticizer is preferred, especially if the stock is to be dip coated. In spray coating the coating dries so quickly that there is little drain back from the stock into the tank and hence the "draw-out" of the constituents tends to remain uniform. However, the coupler and plasticizer does seem to assist in maintaining good dispersion of the paraffine.

Generally in the dry composition, the organic lubricating material will range from 5 to 30 parts, the paraffine 1 to 8 parts, the plasticizer and coupler (if it be included) ½ to 5 parts, and the borax the balance to make 100 parts, each by dry weight, the amount of defoamer being from just in excess of that required for defoaming up to saturation, for example, from 10 grams per 100 pounds of the dry mix up to saturation and preferably about 14 to 40 grams per 100 pounds.

In adding the paraffine to the compositions of the prior patents, the total addition preferably should be limited so that the amount of paraffine in the resulting composition does not exceed the amount of organic constituent in the resultant composition, and the amount of organic constituent does not become less than the minimum set forth hereinbefore, or in the examples and description hereinafter set forth, which latter may be as low as 5% of the dry mix.

As mentioned, it is to be remembered in determining the amount of paraffine to be used that its lubricity remains somewhat constant regardless of its melting point. Accordingly, if lower titre soap or low melting point organics were used, the higher melting point paraffine may be used for compensating for the lower melting point of the organics. On the other hand, if high melting point organics such as waxes are used, a lower melting point paraffine may be used for compensating for the higher melting point and reducing it if desired.

Generally, a preferred use of the paraffine, in addition to increasing lubricity, is for compensating for the fact that soaps and other organics normally available commercially and at a price and in quantities making them suitable for the present compositions are not of as high melting point as desired, are somewhat hygroscopic, and are not as rapid drying as desired.

Thus, if lubricity and the melting point of the initially operable ingredients are to be increased, soap having a melting point of 42° C. may be combined with enough paraffine so as to raise the average melting point of the two to 50° C. This may be done in a number of ways depending upon the draws desired. For instance, it may be obtained by using a relatively small amount of higher melting point paraffine or relatively larger amount of somewhat lower melting point paraffine. The ratio to use depends somewhat on the type of draw and the amount of organic lubricant which would be used if no paraffine were present.

Assume, for example, that a few trial pieces are drawn with a composition of 18% soap of melting point of 42° C. and about 82% borax, an observation of the workpieces evidences the fact that more lubricity would be desirable in the initial stages of the draw and before borax becomes effective.

In such a case a higher melting point as well as higher lubricity at the start is indicated. The following illustrate the solutions that are possible:

(a) The higher lubricity and melting point can be obtained by replacing 8 parts of the soap with 8 parts of paraffine having a melting point of 58° C. This part of the composition would then have an "average" melting point of about 49° C. and greater lubricity.

(b) If in (a) a higher average melting point and substantially the same lubricity is desired, it can be obtained by using a paraffine of higher melting point.

(c) If in (a) a lower average melting point and substantially the same lubricity is desired, a paraffine having a lower melting point may be used.

(d) If, in the original example, only little more lubricity but the higher melting point is desired, it can be obtained by using a smaller amount of paraffine of much higher melting point, for example, 4 parts of paraffine of 80° C. melting point and 16 parts of soap at 42° C. melting point. This would provide an "average" of about 50° C. melting point, the same as in (a), but less lubricity.

(e) If in the original example much more lubricity and the same melting point is desired, it can be obtained by using 10 parts of soap and 8 parts of paraffine having a melting point of 42° C.

From the foregoing, it is apparent that control and adjustment of the melting points and lubricity of the part of the composition other than the water liberating and glass forming materials can be obtained throughout an exceedingly wide range.

In general, the following formula indicates the procedure to follow, it being borne in mind that the lubricity of paraffine is sufficiently uniform regardless of the melting point of the paraffine, that the overall lubricity increases with an increase in paraffine, that hygroscopicity decreases with an increase in paraffine, and that paraffine in an amount in excess of the organic constituents introduces problems and disadvantages best avoided:

$$\frac{(A \times a) + (B \times b) + \ldots + (\times n) + (Z \times z)}{A + B + \ldots + N + Z} = \text{average melting point}$$

where A, B, C, ÷ . . . N are the amounts of the organics, respectively, and the corresponding lower case letters are the corresponding melting points, and Z is the amount of paraffine and z its melting point.

Thus by using equal parts of soap of melting point 42° C. and paraffine of melting point 80° C., the average melting point of the initially operative part of the composition could be raised to 61° C.

Again, in a composition of 10 parts soap with a melting point of 42° C. and 90 parts borax, if it is desired to increase lubricity and raise the average melting point of the initially operable ingredients, this might be done by adding 5 parts of paraffine and reducing the borax to 85 parts, thus the ratio of soap to paraffine would be 2 to 1. If in such an instance an average melting point of 50° C. were desired for the initially operable part of the composition, then the paraffine used would be one having a melting point of 66° C.

On the other hand, assume that a composition is used employing 10 parts of wax of melting point 95° C. and 5 parts of soap of melting point 40° C., and it is desired to reduce the melting point as low as possible while retaining the wax, soap and 80 parts borax, then 5 parts of paraffine at 32° C. melting point would be employed. Then the "average" melting point of the wax, soap and paraffine portion of the combination would be 65½° C.

Paraffine in excess of 8 parts per one hundred parts of the dry composition results in a coating which tends toward brittleness and lowered tenacity and flakes off of the stock badly.

Having taught the benefits of using an excess amount of soap solvent coupling agent, a number of typical examples of the compositions selected from the foregoing patents and applications, as modified by the addition of excess of agent, are set forth immediately following for purposes of illustration, it being understood that the excess agent can be added to any of the compositions of any of the above entitled patents and applications with beneficial results.

Furthermore, I have found that for some purposes satisfactory drawing material can be provided by use of the agents of Table I with soap alone, even without water, by providing waxy anhydrous soap films unlike commonly known hydrated soap films of the prior art.

When used in aqueous solutions with soap alone, they may be used in much larger amounts, for example, from about 5 pounds to 100 pounds of soap, or about saturation, it being understood that saturation of the agent in the aqueous soap solution, not in water alone, is meant.

In between these extremes the agent is particularly effective in ratios of the organics to the inorganics of 5 to 95 parts, as in Example 1 below, and with or without parts D and E of Example I, which parts, if omitted, do not change the number of parts of the other ingredients. In these following examples, the ratios are in parts by dry weight, and the soap solvent and coupling agent, or defoamer, is expressed in grams and means "grams per 100 pounds of the dry composition."

*Example 1*

|  | Range | Preferred |
|---|---|---|
| Part "A": Water soluble or readily water dispersible, fatty or waxy polar organic lubricating binder of high molecular weight and solid at room temperature and having a melting point of at least about 26° C., but preferably higher, such for example as the following: soap, preferably high titre soap having a melting point of at least about 36° C.; polymerized or esterified aliphatic polyhydric alcohols having less than 4 hydroxy groups and the fatty acid esters thereof, each of which is of the type that is solid at room temperature and each of which preferably has a melting point of at least about 40° C.; and synthetic waxes of high melting point and preferably a melting point of at least about 90° C.; and mixtures of any two or more of the foregoing__parts__ | 10 to 33 | 20 |
| Part "B": Water soluble inorganic water liberating and glass forming material, preferably alkali earth metals and preferably with alkali metal borate as at least a major portion_____parts__ | 90 to 67 | 80 |
| Part "C": Soap solvent coupling material or agent having low vapor pressures and low water solubility combined with high fat solubility and boiling points above that of water, and preferably consisting of those selected from Table I, in a concentration ranging from just above that for defoaming to saturation in an aqueous solution of the drawing composition grams__ | 7 to 80 | 20 |
| Part "D": Paraffine (optional and not to exceed the amount of Part "A")_____parts__ | 1 to 8 | 5 |
| Part "E": (Optional) plasticizer and coupler preferably of the sulfonated oil type_____parts__ | ½ to 5 | 1 |

*Example 2*

The composition of Example 1 characterized in that Part E is coupling and plasticizing material selected from one of the following groups:

Group A:
    Sulfonated vegetable oil,
    Sulfonated animal oil, and
    Sulfonated unsaturated fatty acid derivative of animal oil and of vegetable oil, and Group B:
    The surface active agent in combination with a plasticizing agent.

While as mentioned, in each of the following examples, the soap solvent coupling agent is expressed in grams and means "grams per 100 pounds of the dry composition," and also in the interest of brevity, in each example which includes ingredients from Part D or E, each of these parts is to be considered optional in the sense that the same formula without such parts has operating advantages over the art, even though with such parts it has additional advantages due to the cooperation of Parts D or E with Parts A through C. The soap used may be any of the commercially available soaps, the controlling features being their lubricity or mechanical functions rather than their chemical compositions.

*Example 3*

| | | |
|---|---|---|
| Sodium tallow soap | parts__ | 15 |
| Boric acid | do____ | 20 |
| Borax | do____ | 20 |
| Potassium carbonate | do____ | 25 |
| Paraffine (M. P. 60° C.) | do____ | 8 |
| Trimethyl nonyl alcohol | grams__ | 64 |

*Example 4*

| | | |
|---|---|---|
| Sodium tallow soap | parts__ | 15 |
| Boric acid | do____ | 15 |
| Borax | do____ | 20 |
| Potassium carbonate | do____ | 30 |
| Paraffine (M. P. 60° C.) | do____ | 5 |
| Octylene glycol | grams__ | 34 |

*Example 5*

| | | |
|---|---|---|
| High titre soap | parts__ | 5 |
| Ethylene glycol | do____ | 5 |
| Boric acid | do____ | 20 |
| Borax | do____ | 20 |
| Potassium carbonate | do____ | 25 |
| Paraffine (M. P. 50° C.) | | 6 |
| Nonyl alcohol | grams__ | 80 |

*Example 6*

| | | |
|---|---|---|
| Tallow soap (M. P. 36° C.) | parts__ | 15 |
| Borax | do____ | 85 |
| Sulfonated castor oil | do____ | 1 |
| Paraffine (M. P. 70° C.) | do____ | 4 |
| Dibutoxytetraglycol | grams__ | 12 |

*Example 7*

| | | |
|---|---|---|
| Palm oil soap (M. P. 42° C.) | parts__ | 20 |
| Borax | do____ | 80 |
| Sulfonated vegetable and animal oil | do____ | 0.5 |
| Paraffine (M. P. 50° C.) | do____ | 3 |
| Amyl alcohol | grams__ | 16 |

*Example 8*

| | | |
|---|---|---|
| Palm oil soap (M. P. 42° C.) | parts__ | } 19 |
| Tallow soap (M. P. 40° C.) | do____ | |
| Borax | do____ | 80.5 |
| Sulfonated olive oil | do____ | 0.5 |
| Paraffine (M. P. 44° C.) | do____ | 5.5 |
| Dihexyl ether | grams__ | 30 |

*Example 9*

| | | |
|---|---|---|
| Polyethylene glycol (M. P. 40° C.) | parts__ | 10 |
| Cetyl acetamide (90°) | do____ | 20 |
| Borax | do____ | 70 |

| | |
|---|---|
| Sulfonated oleic acid | do____ 2.5 |
| Paraffine (M. P. 32° C.) | do____ 5 |
| Hexal alcohol | grams__ 30 |

Example 10

| | |
|---|---|
| Acrowax | parts__ 25 |
| Borax (53) | do____ } 55 |
| Sodium silicate (2) | do____ } |
| Diglycol stearate | do____ 16 |
| Sodium lamyl sulphate | do____ 4 |
| Paraffine (M. P. 34° C.) | do____ 3 |
| Heptadecanol | grams__ 18 |

Example 11

| | |
|---|---|
| Polyethylene glycol | parts__ 15 |
| Borax | do____ 85 |
| Sulfonated castor oil | do____ 1 |
| Paraffine | do____ 7 |
| Nonyl alcohol | grams__ 46 |

Example 12

| | |
|---|---|
| Polyethylene glycol | parts__ } 20 |
| Polyethylene glycol oleate | do____ } |
| Borax | do____ 80 |
| Paraffine | do____ 4 |
| Tripropylene glycol butyl ether | grams__ 13 |

Example 13

| | |
|---|---|
| Glycerol monostearate | parts__ } 12 |
| Polyethylene glycol oleate | do____ } |
| Potassium borate | do____ 80 |
| Sulfonated herring oil | do____ 2 |
| Paraffine (M. P. 42° C.) | do____ 6 |
| Acetophenone | grams__ 24 |

Example 14

| | |
|---|---|
| Propylene glycol stearate | parts__ } 20 |
| Diglycol stearate | do____ } |
| Lithium borate | do____ 80 |
| Sulfonated castor oil | do____ 2 |
| Paraffine | do____ 7 |
| Dichloroethyl ether | grams__ 14 |

Example 15

| | |
|---|---|
| Tallow soap (M. P. 42° C.) | parts__ 5 |
| Polyethylene glycol (M. P. 40° C.) | do____ 10 |
| Borax | do____ 85 |
| Paraffine (M. P. 65° C.) | do____ 5 |
| Trimethyl nonyl alcohol | grams__ 20 |

Example 16

| | |
|---|---|
| Palm oil soap (M. P. 44° C.) | parts__ 10 |
| Polyethylene glycol (M. P. 40° C.) | do____ 12 |
| Borax | do____ 78 |
| Paraffine (55° C.) | do____ 3 |
| Sulfonated corn oil | do____ 2 |
| Nonyl alcohol | grams__ 14 |

Example 17

| | |
|---|---|
| Borneo tallow soap | parts__ 20 |
| Glycerol monostearate and polyethylene glycol oleate | do____ 5 |
| Borax | do____ 75 |
| Paraffine (M. P. 50° C.) | do____ 3.5 |
| Methyl isobutyl carbinol | grams__ 27 |

Example 18

| | |
|---|---|
| Tallow soap (M. P. 42° C.) | parts__ 20 |
| Borax | do____ 80 |
| Paraffine (M. P. 50° C.) | do____ 5 |
| Trimethyl nonyl alcohol | grams__ 14 |

Example 19

| | |
|---|---|
| Tallow soap (M. P. 44° C.) | parts__ 15 |
| Borax | do____ 45 |
| Sodium carbonate | do____ 15 |
| Sodium silicate | do____ 10 |
| Paraffine (M. P. 40° C.) | do____ 1 |
| Nonyl alcohol | grams__ 40 |

Example 20

| | |
|---|---|
| Borneo tallow soap | parts__ } 18 |
| "Triple pressed" palm oil soap | do____ } |
| Borax | do____ 80 |
| Sulfonated herring oil | do____ 2 |
| Paraffine (M. P. 46° C.) | do____ 6 |
| Hexyl alcohol | grams__ 24 |

Example 21

| | |
|---|---|
| Tallow soap (M. P. 26° C.) | parts__ 12 |
| Borax | do____ 90 |
| Paraffine (M. P. 70° C.) | do____ 13 |
| Trimethyl nonyl alcohol | grams__ 80 |

Example 22

| | |
|---|---|
| Tallow soap (M. P. 32° C.) | parts__ 15 |
| Borax | do____ 85 |
| Paraffine (M. P. 67° C.) | do____ 8 |
| Nonyl alcohol | grams__ 50 |

Example 23

| | |
|---|---|
| Soap (M. P. 28° C.) | parts__ 20 |
| Borax | do____ 80 |
| Paraffine (M. P. 78° C.) | do____ 10 |
| Trimethyl nonyl alcohol | grams__ 40 |

Example 24

| | |
|---|---|
| Tallow soap | parts__about 95 |
| Borax | do____about 5 |
| Trimethyl nonyl alcohol | grams__ 30 |

Example 25

| | |
|---|---|
| Palm oil soap | parts__ } about 95 |
| Tallow soap | do____ } |
| Borax | do____ about 5 |
| Ethyl butyl ketone | grams____ 40 |

Example 26

| | |
|---|---|
| Tallow soap having a titre of about 27° C. | parts__about 95 |
| Borax | do____about 5 |
| Octylene glycol | grams__ 70 |

Example 27

| | |
|---|---|
| Palm oil soap | parts__ } about 95 |
| Tallow soap | do____ } |
| Borax | do____ about 5 |
| Dipropylene glycol butyl phenyl | grams__ 16 |

Example 28

| | |
|---|---|
| Borneo tallow soap | parts__about 95 |
| Borax | do____about 5 |
| Di hexyl ether | grams__ 50 |

Example 29

| | |
|---|---|
| Cocoa butter soap | parts__ 15 |
| Polyethylene glycol oleate | do____ 5 |
| Borax | do____ 80 |
| Trimethyl nonyl alcohol | grams__ 54 |

Example 30

| | |
|---|---|
| Stearin soap | parts__ 5 |
| Polyethylene glycol stearate | do____ 10 |
| Lithium borate | do____ 85 |
| Di butyl oxitetra glycol | grams__ 14 |

Example 31

| | |
|---|---|
| Coaceric; Japanic soap | parts__ 10 |
| Polyethylene glycol oleate | do____ 5 |
| Lithium borate | do____ 85 |
| Trimethyl nonyl alcohol | grams__ 40 |

Example 32

| | | |
|---|---|---|
| Polyethylene glycol oleate | parts | 7 |
| Polyethylene glycol | do | 12 |
| Lithium borate | do | 31 |
| Borax | do | 50 |
| Tripropylene glycol butyl ether | grams | 18 |

Example 33

| | | |
|---|---|---|
| Polyethylene glycol oleate | parts | 20 |
| Borax | do | 80 |
| Nonyl alcohol | grams | 40 |

Example 34

| | | |
|---|---|---|
| Cetyl acetamide | parts | 20 |
| Polyethylene glycol | do | 10 |
| Borax | do | 70 |
| Trimethyl nonyl alcohol | grams | 20 |

Example 35

| | | |
|---|---|---|
| Napcowax | parts | 15 |
| Borax | do | 85 |
| Acetophenone | grams | 23 |

Example 36

| | | |
|---|---|---|
| Polyethylene glycol oleate | parts | 20 |
| Borax | do | 80 |
| Trimethyl nonyl alcohol | grams | 80 |

Example 37

| | | |
|---|---|---|
| Durocer | parts | 12 |
| Polyethylene glycol oleate | do | 6 |
| Borax | do | 82 |
| Methyl isobutyl carbinol | grams | 30 |

Generally, the amount of soap solvent and coupling or defoaming agent is increased with an increase of soap and decreased with a decrease of soap. Thus, the soap solvent coupling agent may range from an amount of about 0.02 percent, just above that required for defoaming, to an amount of 100 percent of the dry ingredients though use of the soap solvent and coupling agent beyond the amount required for saturation of the solution is wasteful and its use as the main solvent is economically undesirable, though operative. In substituting one or more of the soap solvent and coupling or defoaming agents for another, they should be substituted according to molecular weights; for example, if one agent has a molecular weight of 2 W and another W, two parts of the latter should be substituted for each part of the former. In general, the higher the solubility of the agent, the higher can be the concentration of the bath of the lubricating composition.

The advantages resulting from the addition of the soap solvent coupling or defoaming agents in the proper amounts are as follows:

The resultant solution can be applied readily by spraying, both when the plasticizing and coupling agents are present or absent, whereas without the soap solvent coupling agent, the solutions are difficult to spray and, in fact, generally cannot be sprayed with conventional spraying equipment regardless of whether the plasticizers and couplers are present or not. The solution made in accordance with the present invention not only can be sprayed effectively but can be sprayed with conventional nozzles and equipment.

Uniform drainage of the solution from the sheet metal is obtained and elimination breaks and patterns in the resultant coating results. The resultant coating is exceedingly smooth, dry, and hard.

The drawout of the bath is more uniform, particularly when the sheets are coated by immersion and the coupling and plasticizing agents are included.

The drying time is reduced and this, continued with the easy flow of the solution and uniform and prompt drainage, produces a smoother, thinner, and more uniform coating. The coating likewise dries to a harder consistency. In fact, if the coated surface is scraped with a knife, the coating powders rather than strips off in thin shavings or chips.

Since the coating can be made more uniform and free from patterning and the like which usually accompanies drawing with soap alone or compositions high in soap content, it can be made thinner with assurance that all areas of the sheet are covered. This, in turn, makes it possible to provide a harder coat.

Due to the thinness and hardness of the coat made possible by its uniformity, the drawability of the coated stock in the dies is greatly enhanced and the buildup of excess composition or coating material on the dies is substantially eliminated.

Another very distinct advantage obtained as a result of the use of the present invention, and enhanced in those instances in which the combined coupler and plasticizer is included along with a soap solvent and coupling agent, is the reduction in pick-up of moisture by the coating and the metal stock and the resultant effective rustproofing of the metal by the coating. It has been found that a coating produced with the composition after the addition of the soap solvent and coupling agent can be left standing for long periods in a shop, even where the relative humidity is quite high, without the coating becoming soft or tacky and without the metal sulling or rusting either from the moisture originally included in the coating solution or moisture picked up after coating.

While I have disclosed a number of examples in which the soap solvent and coupling material is used, it is to be noted that it can be used in all of the specific examples disclosed in my copending application Serial No. 337,437, filed February 17, 1953, and may be used in the ratio of an amount which is in excess of that required for defoaming up to and including saturation in an aqueous solution of the compositions therein disclosed. Further, it is to be noted that while Palm oil soap and tallow soaps are preferred, other organic materials and other soaps such as disclosed in the above mentioned copending application and the hereinbefore identified applications and letters patent, may be used, the effectiveness of the particular soap depending on its mechanical lubricating features rather than on its specific chemical composition. Therefore, the working examples disclosed in my copending application Serial No. 337,437 are incorporated herein by reference.

The present application is a continuation-in-part of my copending now abandoned application Serial No. 410,737, filed February 16, 1954.

Having thus described my invention, I claim:

1. A coating material for admixture with water for coating a piece of blank metal stock and forming thereon a self-adherent, dry, homogeneous lubricating and protecting film consisting essentially of the following ingredients:

| | |
|---|---|
| Water-soluble high titre soap having a melting point of at least about 36° C. | 10 to 33 parts |
| Water-soluble, inorganic, water liberating and glass forming material of which at least a major part thereof is an alkali metal borate. | 90 to 67 parts |
| Coupling and plasticizing material selected from the groups consisting of the following— | ½ to 5 parts |

A. Combined coupling and plasticizing material in the form of at least one compound selected from the group consisting of sulfonated vegetable oils, sulfonated animal oils, and sulfonated unsaturated fatty acid derived from animal oil and vegetable oil;

B. Coupling and plasticizing material in the form of at least two compounds, at least one compound being selected from each of the following groups:

1. Coupling agent: Surface active, water-soluble, alkali metal salts of organic compounds containing a sulfo-group in the molecule;

2. Plasticizing agent: Vegetable oils and animal oils

A soap solvent coupling agent selected from the group consisting of trimethyl nonyl alcohol, butyl alcohol, amyl alcohol (normal), 2-butyl octanol, di-isobutyl carbinol, 2-ethyl hexanol, 2-ethyl butanol, heptanol, lauryl alcohols, heptadecanol, methyl amyl alcohol, methyl isobutyl carbinol, tetradecanol, cyclohexanol, pentanol-3, tri methyl, undecanol, di-isobutyl ketone, ethyl butyl ketone, methyl isobutyl ketone, acetophenone, ethyl hexane diol, ethoxy di-methyl pentane diol, hexylene glycol, octylene glycol, dibutyl carbitol, di butoxy tetra glycol, phenyl carbitol, phenyl methyl carbinol, propylene glycol-butyl ether, di-propylene glycol butyl ether, tri-propylene glycol butyl ether, ethylene glycol phenyl ether, propylene glycol phenyl ether, di-propylene glycol phenyl ether, propylene glycol butyl phenyl ether, propylene glycol cyclohexyl phenyl ether, tri-propylene glycol isopropyl ether, dichloro ethyl ether, di ethyl ether, di hexyl ether, and mixtures thereof in an amount equivalent to about 25 ounces to about 2.5 ounces per 100 pounds of the solute.

2. A coating material in accordance with claim 1, in that paraffine is present in the amount by dry weight of 1 to 8 parts.

3. A coating material in accordance with claim 2, in which the inorganic material is borax.

4. A coating material in accordance with claim 2, in which the coupling and plasticizing material is in the form of one compound.

5. A coating material in accordance with claim 2, in which the soap solvent and coupling agent is present in an amount equivalent to about .45 ounce to about 1.3 ounces per 100 pounds of solute.

6. A coating material in accordance with claim 1, in which the soap solvent and coupling agent is present in an amount equivalent to about .45 ounce to about 1.3 ounces per 100 pounds of solute.

7. A coating material in accordance with claim 1, in which the organic lubricating binder is tallow soap, the inorganic material is borax, the coupling and plasticizing material is sulphonated castor oil, and the soap solvent coupling agent is trimethyl nonyl alcohol.

8. A coating material in accordance with claim 1, in which the high titre soap is present in an amount of about 20 parts, the inorganic material is present in an amount of about 80 parts, the coupling and plasticizing material is present in the amount of about 1 part, and the soap solvent coupling agent is present in an amount equivalent to about .45 ounce to about 1.3 ounces per 100 pounds of solute.

9. A composition in accordance with claim 8, in which paraffine is included in an amount of about 5 parts.

10. A coating material in accordance with claim 8, in which the high titre soap is tallow soap, the inorganic material is borax, the coupling and plasticizing material is sulphonated castor oil, and the soap solvent coupling agent is trimethyl nonyl alcohol.

11. A coating material for admixture with water for coating a piece of blank metal stock and forming thereon a self-adherent, dry, homogeneous lubricating and protecting film consisting essentially of the following ingredients:

A water-soluble soap_____ 10 to 33 parts
Water-soluble, inorganic, water liberating 90 to 67 parts
   and glass forming material of which at
   least a major part thereof is an alkali
   metal borate.
Coupling and plasticizing material selected ½ to 5 parts
   from the groups consisting of the
   following—
    A. Combined coupling and plasticizing material in the form of at least one compound selected from the group consisting of sulfonated vegetable oils, sulfonated animal oils, and sulfonated unsaturated fatty acid derived from animal oil and vegetable oil;
    B. Coupling and plasticizing material in the form of at least two compounds, at least one compound being selected from each of the following groups:
      1. Coupling agent: Surface active, water soluble, alkali metal salts of organic compounds containing a sulfo-group in the molecule;
      2. Plasticizing agent: Vegetable oils and animal oils A soap solvent coupling agent selected from the group consisting of trimethyl nonyl alcohol, butyl alcohol, amyl alcohol (normal), 2-butyl octanol, di-isobutyl carbinol, 2-ethyl hexanol, 2-ethyl butanol, heptanol, lauryl alcohols, heptadecanol, methyl amyl alcohol, methyl isobutyl carbinol, tetradecanol, cyclohexanol, pentanol-3, tri methyl, undecanol, di-isobutyl ketone, ethyl butyl ketone, methyl isobutyl ketone, acetophenone, ethyl hexane diol, ethoxy di-methyl pentane diol, hexylene glycol, octylene glycol, dibutyl carbitol, di butoxy tetra glycol, phenyl carbitol, phenyl methyl carbinol, propylene glycol-butyl ether, di-propylene glycol butyl ether, tri-propylene glycol butyl ether, ethylene glycol phenyl ether, propylene glycol phenyl ether, di-propylene glycol phenyl ether, propylene glycol butyl phenyl ether, propylene glycol cyclohexyl phenyl ether, tripropylene glycol isopropyl ether, dichloro ethyl ether, di ethyl ether, di hexyl ether, and mixtures thereof in an amount equivalent to about 25 ounces to about 2.5 ounces per 100 pounds of the solute.

References Cited in the file of this patent

UNITED STATES PATENTS

| | | |
|---|---|---|
| 2,326,387 | Nill | Aug. 10, 1943 |
| 2,470,913 | Bjorksten et al. | May 24, 1949 |
| 2,524,017 | Hance et al. | Sept. 26, 1950 |
| 2,530,838 | Orozco et al. | Nov. 21, 1950 |
| 2,662,836 | Montgomery et al. | Dec. 15, 1953 |